ELECTRONIC TIMER ESCAPEMENT AND COIN COUNTER

Original Filed May 31, 1966 5 Sheets-Sheet 1

INVENTOR.
James L. McConnell

Hill Sherman Meroni Gross & Simpson

ATTORNEYS

BY

ELECTRONIC TIMER ESCAPEMENT AND COIN COUNTER

Original Filed May 31, 1966 5 Sheets-Sheet 2

INVENTOR.
James L. McConnell

Hill Sherman Meroni Gross & Simpson

BY ATTORNEYS

ELECTRONIC TIMER ESCAPEMENT AND COIN COUNTER

Original Filed May 31, 1966 5 Sheets-Sheet 3

INVENTOR.
James L. McConnell
Hill Sherman Meroni Gross & Simpson
ATTORNEYS

BY

ELECTRONIC TIMER ESCAPEMENT AND COIN COUNTER

Original Filed May 31, 1966 5 Sheets-Sheet 4

INVENTOR.
James L. McConnell

BY Kill, Sherman, Morsell, Gross & Simpson ATTORNEYS

ELECTRONIC TIMER ESCAPEMENT AND COIN COUNTER

Original Filed May 31, 1966 5 Sheets-Sheet 5

INVENTOR.
James L. McConnell

BY Hill, Sherman, Meroni, Gross & Simpson ATTORNEYS

United States Patent Office

Re. 26,957
Reissued Sept. 29, 1970

26,957

ELECTRONIC TIMER ESCAPEMENT AND COIN COUNTER

James L. McConnell, St. Joseph, Mich., assignor to Whirlpool Corporation, Benton Harbor, Mich., a corporation of Delaware Original No. 3,360,092, dated Dec. 26, 1967, Ser. No. 559,649, May 31, 1966. Application for reissue Oct. 24, 1968, Ser. No. 785,818
Int. Cl. G07f *5/10*
U.S. Cl. 194—9 43 Claims

Matter enclosed in heavy brackets [ ] appears in the original patent but forms no part of this reissue specification; matter printed in italics indicates the additions made by reissue.

ABSTRACT OF THE DISCLOSURE

A control circuit for home and/or coin-operated appliances such as washing machines, dry cleaning machines and clothes dryers which require different time intervals to accomplish respective individual functions wherein an electronic control circuit periodically energizes a motor for incremental rotation and wherein the periods between such motor energizations are varied. A pulse-generating circuit is combined with a sequential controller so that the width of the pulses is adjustable to provide variable sequential timing.

This is a continuation-in-part application of Serial No. 373,157 filed June 8, 1964, now forfeited.

This invention relates generally to a control circuit for sequencing the operation of appliances and the like wherein a plurality of functions are to be carried out for respective time periods depending upon the type of appliance or the type of load to be supplied to the appliance. The invention is particularly intended to provide a control circuit of a basic design which is adaptable to the control of a line of home and/or coin-operated appliances such as washing machines, dry cleaning machines, and clothes dryers which require different time intervals to accomplish respective individual functions.

In appliance control circuits of the type employing a series of timing cams, it has heretofore been common practice to manufacture a number of different cams for the various time intervals involved in the sequencing of the various types of appliances. As appliances become more complex and new types of appliances are added to a manufacturer's line, the number of different cams which must be produced has also increased. In an embodiment of the present invention a basic set of actuating cams is provided which may be moved at different rates at different parts of an operating cycle so as to provide any desired combination of timing sequences. The particular timing sequences for different appliances or for different operating cycles of a given appliance may be very simply determined, for example by the selection of particular resistance values in a bank of timing resistors which control the timing of the successive steps in an overall cycle of operation.

It is therefore an object of this invention to provide a simple and economical appliance control circuit which is readily adapted to provide a variety of different timing sequences.

It is a further object of the invention to provide a timing control circuit which is also capable of performing a coin counting function in coin operated appliances.

Another object is to provide an appliance control circuit having a high degree of flexibility as to available timing cycles and which is readily equipped with means for selecting different timing sequences.

Still another object of the invention is to provide a combination timing and coil counting circuit which is readily adjusted so as to be actuated by different numbers of coins.

Yet another object of the present invention is to provide a basic sequential timer control which can be used to control the operation of various types of appliances and/or machines.

Still another object of the present invention is to provide a sequential timer control which can be adapted to condition sensing devices, for example, water level sensing devices, temperature sensing devices and pressure sensing devices, which devices will coact with the sequential timer control to control the operation of the apparatus being controlled.

A still further object of the present invention is to provide simple and efficient electronic switching means to control the energization of a drive motor.

In the past, many appliances have been sequenced by means of a relatively expensive timing control requiring a high quality motor that would not vary appreciably in speed. Also, if the appliance was to be activated by the insertion of one or more coins, a separate coin counting and coin rejection control circuit was required.

A feature of the present invention resides in the provision of an appliance control circuit which employs a relatively inexpensive shaded pole motor.

Another feature of the invention involves the provision of an appliance control circuit having a timing mechanism which is advanced a predetermined increment in response to each coin inserted into a coin mechanism and which automatically begins its normal timing cycle after a predetermined number of coins have been received, and which at the end of the sequential control cycle is automatically reset to a predetermined position in readiness for a subsequent coin counting cycle.

A further important feature of this invention involves the use of a pulse generating circuit in combination with a sequential controller wherein the width of the pulses is adjustable to provide variable sequential timing. The pulse width may be selected by an infinitely adjustable control operable by the user, if desired.

Another feature of the present invention is the adaptation of one or more condition sensing devices which are connected in circuit with an electronic timing circuit to coact therewith thereby sequencing the apparatus under control as a function of time as well as a function of one or more preselected conditions.

Yet another feature of the present invention is the use of a silicon controlled rectifier connected in series with a timer drive motor to initiate energization thereof.

These and other objects, features and advantages will become more fully realized and understood from the following detailed description when taken in conjunction with the accompanying drawings in which like reference numerals through the various views of the drawings are intended to designate similar elements or components and wherein.

Figure 1:
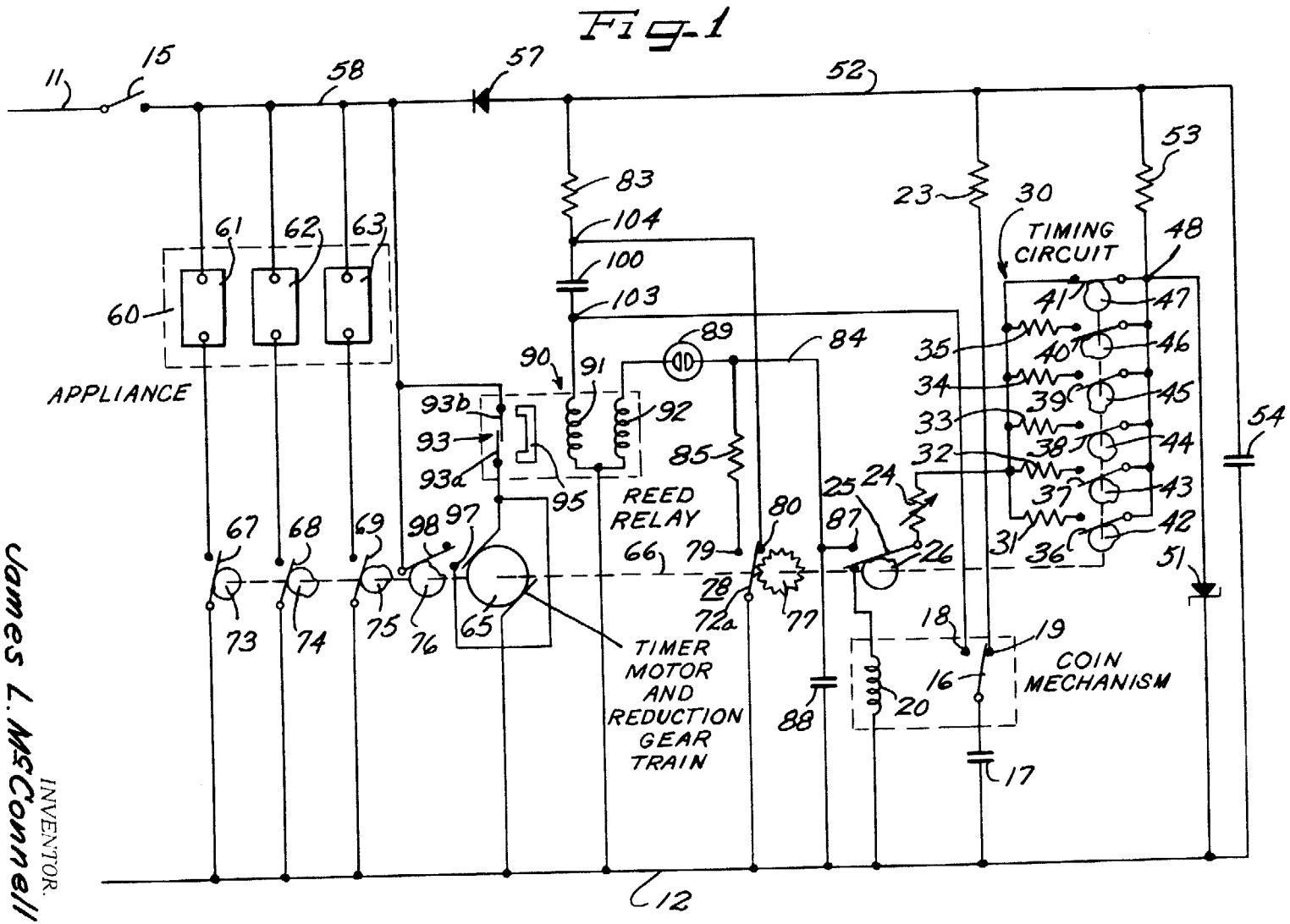
FIGURE 1 is a schematic diagram showing an appliance control circuit in accordance with this invention.

The appliance control circuit shown in FIGURE 1, is designed to be energized by a source of alternating current through a pair of conductors 11 and 12. A main switch 15 is closed to place the control in condition for operation; however, in the illustrated embodiment a predetermined number of coins must be inserted into a coin mechanism after closure of switch 15 before the control begins its timing cycle.

The insertion of each coin of the required denomination may momentarily actuate a switch 16. The switch 16 serves to momentarily connect a capacitor 17 with a capacitor discharge circuit associated with stationary contact 18 of the switch and then to reconnect the capacitor 17 with its charging circuit extending through resistor 23 to stationary contact 19 of the switch.

A coin reject device is controlled by a solenoid 20. So long as the solenoid 20 is energized, coins are accepted and the switch 16 may be actuated by inserted coins. The solenoid energizing circuit extends through a variable resistor 24 and is controlled by a switch 25. Each actuation of coin operated switch 16 causes an incremental rotation of cam 26 until a point is reached where cam 26 shifts switch 25 to its upper position to deenergize solenoid 20 and thus to cause any further coins to be returned without actuating coin switch 16.

With the actuation of switch 25 to its upper position by cam 26, a timing circuit 30 becomes effective. The timing circuit 30 comprises a plurality of resistors 31–35 and a plurality of sequentially operated switches 36–41 which are successively closed by respective sequencing cams 42–47. Connected to a common circuit point 48 of the switches 42–47 is a Zener reference diode 51 which serves to determine the input voltage to the timing circuit 30. D.C. line 52 is connected to circuit point 48 through a resistor 53. A filter capacitor 54 is connected between the lines 12 and 52 to eliminate unwanted variations in the D.C. supply. The line 52 is connected to supply line 11 through a rectifier 57, line 58 and switch 15.

An appliance is diagrammatically indicated in FIGURE 1 by a dash line rectangle 60 and is indicated as having a series of electrically operated devices 61–63 for sequential activation during a cycle of operation of the appliance. A shaded pole motor is indicated at 65 for driving an output shaft represented by dotted line 66. The electrical devices 61–63 may comprise motors, pumps, relays and the like, and have electrical energizing circuits controlled by respective sequentially actuated switches 67–69. Mounted on the output shaft 66 of the motor 65 are cams 73–76 which control the respective switches 67–69.

A toothed camwheel 77 is also driven by the output shaft 66 and serves to provide for an intermittent energization of the motor 65 during the timing cycle. During each increment of rotation of the output shaft 66 by the motor 65 a tooth of camwheel 77 shifts switch arm 72a to switch 78 to the left to engage stationary contact 79 and then allows the switch arm to return to its initial right-hand position (under the impetus of suitable spring means, not shown) where it engages stationary contact 80. The contact 80 is connected to the line 52 through a resistor 83, while the contact 79 is connected to a line 84 through a resistor 85. The line 84 connects with a stationary contact 87 of the switch 25, and also with capacitor 88 which is connected with the timing circuit 30 when switch 25 is actuated at the end of the coin counting cycle. A neon lamp 89 is coupled to capacitor 88 in a starting circuit and is arranged to conduct when the voltage across capacitor 88 reaches a predetermined value. The rate of charging of the capacitor to the predetermined voltage value is determined by the timing circuit 30.

Figure 2:
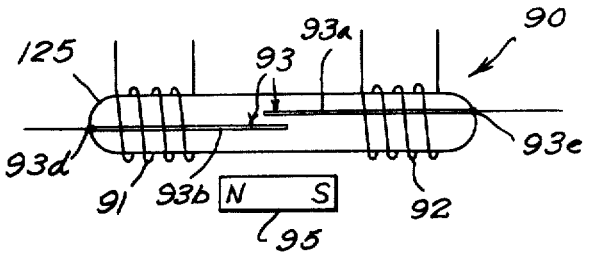
FIGURE 2 is a detailed view showing the construction of a reed switch which is used in the control circuit of FIGURE 1.

A relay device generally designated by reference numeral 90, has connected thereto a pair of windings 91 and 92 for controlling actuation and deactuation of a reed switch 93 which is in a motor energizing circuit. The details of construction of a suitable reed switch are indicated in FIGURE 2. As there indicated, the reed switch 93 may comprise a pair of reed-like contact arms 93a and 93b of magnetically soft material which are magnetized and close when subjected to a magnetic field of sufficient intensity produced by one of the windings 91 and 92. The arms 93a and 93b may be of a spring material and rigidly fixed at 93c and 93d so as to automatically return to the open condition shown in FIGURE 2 when the attracting force therebetween is removed.

The magnet 95 provides a magnetic field of insufficient strength to actuate the switch 93, but of sufficient strength to maintain the arms 93a and 93b in engagement once the arms are actuated to closed position by energization of one of the windings 91 and 92.

The contact arms 93a and 93b may be released from their actuated condition by energization of winding 91 with current of polarity to produce a magnetic field opposing that of the bias magnet 95 in the region of the contact arms and of amplitude to produce a magnetic field substantially cancelling the magnetic field produced by the bias magnet 95 in the contact arms.

The motor 65 has one lead thereof connected to the arm 93a of the switch 93 and also to a contact 97 of a switch 98, while the other lead of the motor 65 is connected to the line 12. The switch 98 is connected to the arm 93b of the switch 93 and to the line 58 to apply power therefrom to the motor 65 during predetermined times.

The pair of magnetic coils 91 and 92 have one end thereof connected to the line 12, while the other end of the magnetic coil 92 is connected to one end of the discharge device 89, and the other end of the magnetic coil 91 is connected to the resistor 83 through a capacitor 100. The capacitor 100 is shown connected to a pair of circuit points 103 and 104 which are connected to contactors 18 and 80 respectively.

The appliance 60 is readied for operation when the switch 15 is closed applying power from the line 11 to the line 58 and through the rectifier 57 to the line 52. The electrical devices 61–63 of the appliance 60 will remain inoperative until the switches 67–69 are actuated at various time intervals by the sequencing cams 73–75. The pulsating D.C. applied to the line 52 will charge capacitor 54 to maintain a relatively constant D.C. voltage between lines 12 and 52. During the preconditioning time before and during inserting of coins or the use of other actuating means, the capacitor 17, connected to the contact 19 through the switch 16, is charged to the D.C. voltage of line 52 through the resistor 23. Also during the preconditioning time, the electromagnetic device 20 is energized through the switch 25, resistor 24, variable timing circuits 30 and resistor 53, thereby allowing the switch 16 to be actuated by a coin. It should be noted at this time that one of the switches 36–41 must be closed at all times. At this time capacitors 88 and 100 are substantially fully discharged.

By way of example and not by way of limitation the coin switch 16 may require two coins to place the appliance 60 into operation. With the first coin, the switch 16, which is initially connected to the contactor 19, will be actuated and come in contact with the contactor 18 thereby discharging the capacitor 17 through the magnetic coil 91 of the switching device 90. This action will establish a magnetic field in the switch arms of the switch 93 causing them to make contact to thereby complete the motor energizing circuit and apply power to the motor 65. When the switch 93 is closed the permanent magnet 95 will exert a sufficient magnetic field adjacent to the switch 93 to maintain its contact arms 93a and 93b in engagement without further current flow passing through the coil 91. The motor 65 will continue to rotate the shaft 66 until the switch 93 is opened. While the incrementally movable cam 77 is rotating, the switch arm 72a is disconnected from contact 80 removing the ground path from point 104, thereby allowing the capacitor 100 to charge through the resistor 83 and the magnetic coil 91. As the incrementally movable cam 77 continues to rotate, the switch arm 72a will be again placed in contact with the contactor 80 to complete a terminating circuit and discharge the capacitor 100 through the magnetic coil 91. This current flow through the magnetic coil 91 is in such a direction as to create a magnetic field of polarity to overcome the magnetic field of the permanent magnet 95, thereby releasing the switch arms 93a and 93b to interrupt the motor energizing circuit and stop the motor 65. It can be seen that as the motor 65 advanced the indexing cam 77 through one increment all the sequencing cams advance the same amount, which by way of example, can be one-twelfth of a complete revolution. The coin switch 16, which makes momentary contact with the contactor 18, is again connected to the contactor 19 thereby allowing the capacitor 17 to recharge through the resistor 23 in readiness for a subsequent coin.

When the second coin actuates the switch 16 and places it in contact with the contactor 18, the capacitor 17 will again discharge through the magnetic coil 91 to actuate the switch 93. Again, the permanent magnet 95 will hold the switch 93 in the closed position until a deenergizing signal is received. As the motor rotates, the incrementally movable cam 77 actuates the switch arm 72a to disconnect it from contact 80 removing the ground path from circuit point 104, thus allowing the capacitor 100 to charge through the resistor 83 and the magnetic coil 91. As the incrementally movable cam continues to advance, the switch arm 78 will again contact contactor 80, discharging the capacitor 100 through the magnetic coil 91 in the opposite direction from the preceding discharge path of capacitor 17. This action will again overcome the biasing force of the permanent magnet 95 thereby deactuating the switch 93 and stopping the motor 65.

It has been noted that the sequencing cams 26, 42, 43, 44, 45, 46, 47, 73, 74, 75, 76, and the indexing cam 77 have advanced exactly two increments of the twelve increments which comprise a complete revolution of the cam 77. At this position of the sequencing cams, the cam 26 has advanced to actuate the switch 25 thereby deenergizing the electromagnetic device 20 to cause rejection of any further coins inserted in the coin mechanism associated with switch 16. Also at this time, the cams in the timing circuit 30 have advanced to open the switch 41 and close the switch 40, thereby forming a charging path for the capacitor 88 through the switch 25, resistor 24, resistor 35, switch 40 and resistor 53. The value of the capacitor 88, resistor 35, and resistor 24 will determine the time required to charge the capacitor 88 to a predetermined voltage (approximately 80 volts, for example).

For purposes of illustration, cams 73–75 have been shown for controlling respective electrical deviecs 61–63 of an appliance. By way of example, the electrical device 61 may be energized by the closure of switch 67 when the cam 73 has indexed or moved to its second predetermined position. If the electrical device 61 in the appliance 60 is to be energized for a 12 minute period, the resistor 35 may be chosen to have a value which allows the capacitor 88 to reach the predetermined voltage in three minutes and the cam 73 may be designed to maintain switch 67 closed during four successive actuations of motor 65. The time required to energize the motor 65 and cause the rotation of the sequencing cams connected thereto during each increment of rotation is comparatively short. Therefore, the total time which the electrical device 61 is energized is controlled primarily by the number of times the motor is to be actuated and the time required to charge capacitor 88 between successive actuations.

In operation, each timing cycle is controlled by the R.C. time constant of capacitor 88, resistor 24, and one or more of the resistors 31–35. As shown in the embodiment of FIGURE 1, as the resistance in series with capacitor 88 is increased the time required to charge capacitor 88 will also increase. By way of example, if sequencing cams 42–47 are so arranged as to have switch 40 close and resistor 35 in series with capacitor 88, the time required to charge capacitor 88 to the discharge voltage of neon lamp 89 may be three minutes. At the end of the three minutes interval capacitor 88 will discharge through the starting circuit, which includes neon lamp 89 and magnetic coil 92, to actuate reed switch 93, and complete the motor energizing circuit, which, in turn, will energize motor 65 thereby advancing the sequencing cams in a similar manner as described hereinabove during the insertion of coins. In this instance, let us assume that switch 40 has opened and switch 39 has closed because of rotation of the sequencing cams 46 and 45. By this function resistor 35 is disconnected from the charging circuit capacitor 88, and resistor 34, which can have a larger value, is connected in the charging circuit of capacitor 88 to provide increased charging time for capacitor 88.

During the rotation of the sequencing cams in the timing circuit 30, the sequencing cams 73–76 are also rotated. By way of example, at the end of the sixth increment of rotation the switch 67 may be opened by the cam 73 and the switch 68 may be closed by the cam 74 thereby deenergizing the electrical device 61 and energizing the electrical device 62. Also at this time, the switch 40 may be opened by the cam 46 and the switch 39 may be closed by the cam 45 placing the resistor 34 in the charging circuit of the capacitor 88 to change the timing cycle between each increment of rotation. The electrical device 62 will continue to be energized until the switch 68 is opened by the cam 74, at which time the electrical device 63 may be energized with switch 69 being held closed by the cam 75. At the end of the cycle of the appliance 60 all the switches 67–69 will be open and the cam 76 will close the switch 98 causing the motor 65 to rotate continuously until all the cams connected thereto are in the reset or preconditioned position, which will place the coin-receiving means in readiness for a subsequent operation.

Figure 3:
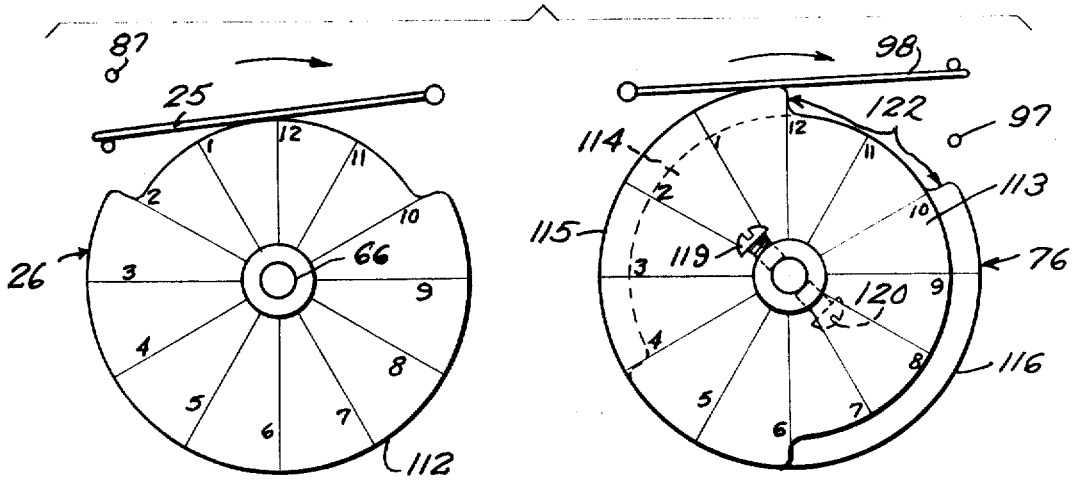
FIGURE 3 is a detailed view showing the relation between the coin counting cam and the end-of-cycle resetting cam in the control circuit of FIGURE 1.

FIGURE 3 illustrates the construction and relationship of the cams 26 and 27 mounted on the common shaft 66. The cam 26 has a lobe portion 112 which, by way of example, may extend for ⅔ of its circumference. The cam 76 can be constructed from a pair of symmetrical cam parts 113 and 114, which have lobe portions 115 and 116 respectively. Securing means 119 and 120 engage shaft 66 to fix the positions of cam parts 113 and 114, respectively, relative to the shaft. An opening 122 between the lobes 115 and 116 can be adjusted to any desired angular extent between 0 and 180 degrees.

If the appliance 60 is to require two coins before the sequential operation starts, the cams 26 and 76 are in the preconditioned position as shown in FIGURE 3. When the first coin is inserted into the appliance coin mechanism, causing the switch 16 to be actuated, the cams 26 and 76 will rotate in the clockwise direction indicated for one increment. When the second coin is inserted into the machine the switch 16 will again be actuated to index the cams 26 and 76 a second time, thereby actuating the switch 25 which is adjacent to the cam 26. Although the cam 26 was positioned in a manner to receive two coins it is possible by adjusting the cam 76 to place the cam 26 in an initial position to require one, two, three or four coins before an operating cycle begins. It will be understood that cams having more than twelve increments of movement can be used in an actual embodiment in accordance with the present invention, or that cam wheel 77 may be driven through gearing so as to make a complete revolution during movement of the other cams through a smaller arcuate distance. The switch 25 will remain actuated for the remainder of the controlling cycle, which is represented by the region from position number 10 to position number 12 on the cams 26 and 76. At the end of the control cycle, position 10 of the cam 76 will actuate the switch 98 causing the motor 65 to rotate the cams 26 and 76 until the switch 98 is opened by the cam 76 at position 12 thereby completing one revolution of the sequencing cams.

If one coin is required for the operation of the appliance 60, the cam 76 will have the lobe 115 thereof adjusted to increase the opening 122 so as to extend between the positions 1 and 10 of the cam part 114. This would cause the timing motor to continue to rotate until the position 1 of cam part 114 was at the top as viewed in FIGURE 3. Therefore, only one coin would be required to move the cam 26 from an orientation with position 1 at the top of an orientation with position 2 at the top. If three coins are required to initiate the operation of appliance 60 the lobe 115 of the cam 76 will be adjusted so as to decrease the extent of the opening 122.

SUMMARY OF OPERATION OF FIGURE 1

When the appliance 60 is ready for operation, the timing motor 65 and sequencing cams connected thereto are in a preconditioned position. A given number of pulses from the coin counting switch 16 are required to set the appliance into a sequence of operation. After insertion of a predetermined number and denomination of coins, the coin counting switch 16 is disabled and will reject any over amount of coins which may be inserted. When each coin is inserted the incrementally movable timing motor 65 will advance one increment, and after the last coin is inserted the timing motor will be incrementally advanced to a position whereby the motor will be controlled by a timing circuit that can be adjusted for the desired operation.

As the cams progress through increments of movement during the sequence of operation, the timing circuit can be automatically varied during respective sequential operations by switching between different values of resistors in the timing circuit 30. The motor 65 is energized and deenergized by a reed switch assembly 90 which is controlled by a pair of discharge capacitors 88 and 100.

When the last sequence of operation is completed, the cam 76 will actuate the switch 98 to apply power to the motor 65 for a time sufficient to rotate the motor 65 and the sequencing cams thereon to a preconditioned position in readiness for a subsequent operation.

Figure 4:
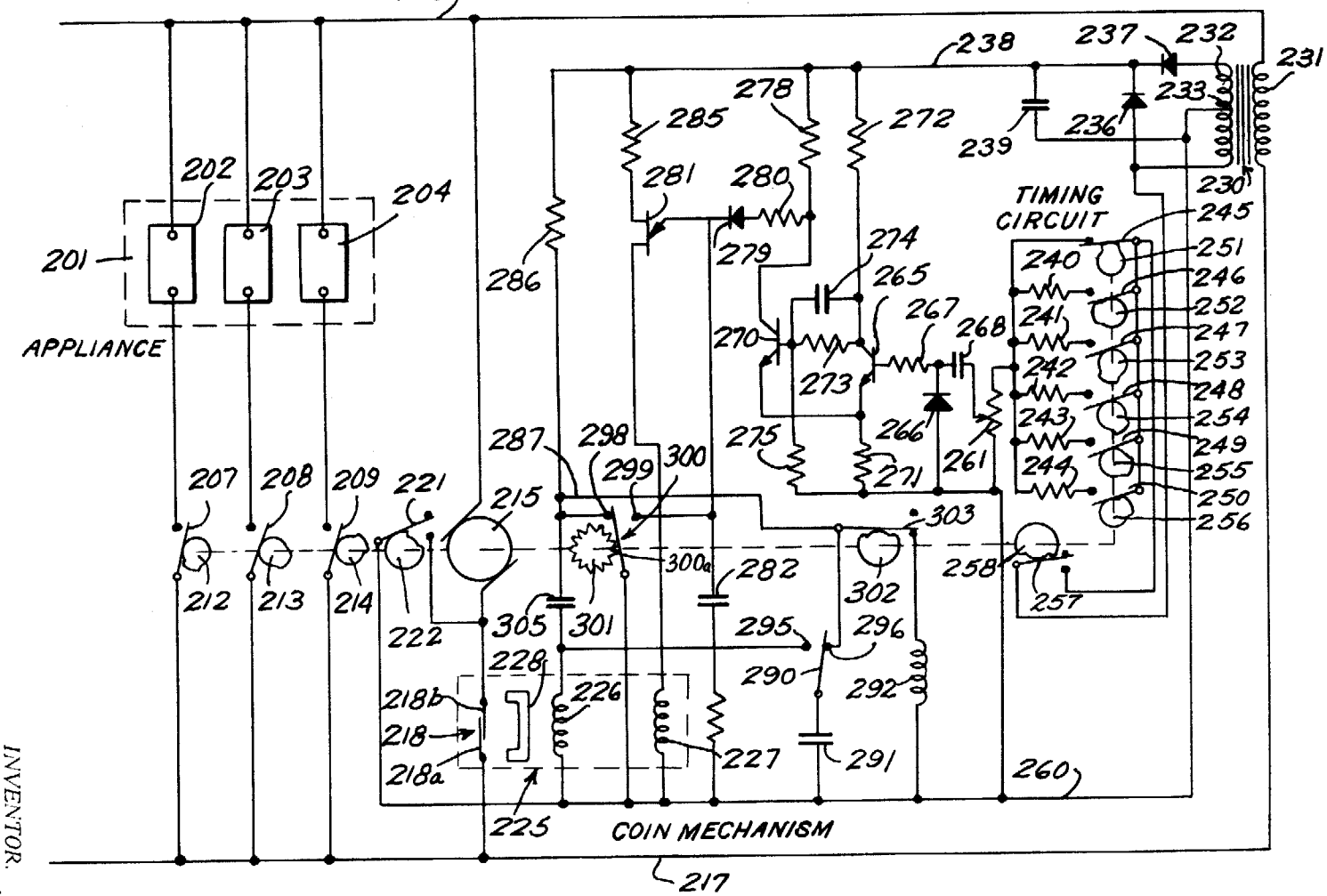
FIGURE 4 is a schematic diagram illustrating a modified form of appliance control circuit in accordance with the present invention.

A modified form of the invention is shown in FIGURE 4. In this embodiment, an appliance is indicated at 201 having a plurality of electrical devices 202–204, which are to be operated by a plurality of switches 207–209 having sequencing cams 212–214 adjacent thereto. A shaded pole motor 215 has one terminal thereof connected to a line 216 and the other terminal connected to a line 217 through a switch 218. Shunting the switch 218 is a switch 221 which is operated by a cam 22. The switch 218 is part of a relay device in the form of a reed switch assembly 225, which has a pair of magnetizing coils 226 and 227 and a biasing permanent magnet 228 located therein. A transformer 30 has a primary winding 231 connected to the leads 216 and 217, and a secondary winding 232 which has a center tap 233. A pair of rectifiers 236 and 237 have their anodes connected to the outer leads of the secondary winding 232, and their cathodes connected to a common tie point on a line 238. Connected between the line 238 and the center tap 233 is the filter capacitor 239. Also connected to the anode electrode of the rectifier 236 is a plurality of resistors 240–244 through a plurality of switches 245–250. The switches are controlled by sequencing cams 251–256 respectively. Also connected to the resistors 240–244 is the center tap 233 of the transformer 230 through a line 260 and an adjustable resistor 261. A start switch 257, which is actuated by cam 258, is placed in series with the center tap 233 and the switch of the timing circuit.

The resistors 240–244 and resistor 261 are connected across one-half of the secondary winding 232 of the transformer 230 and develop alternating signals to be applied to the base electrode of a transistor 265. However, the alternating signal applied thereto is clamped to the potential of line 260 by a rectifier 266 connected between a resistor 267 and a capacitor 268. The emitter electrode of the transistor 265 is connected to the emitter electrode of a transistor 270 and a resistor 271, while the collector electrode of the transistor 265 is connected to the line 238 through a resistor 272. The base of the transistor 270 is also connected to the collector electrode of the transistor 265 through a resistor 273 and a capacitor 274 and to the line 260 through a resistor 275. Connected to the collector electrode of the transistor 270 is the line 238 through a resistor 278, and also a diode 279 through a resistor 280. Connected to the other terminal of the diode 279 is the emitter electrode of a unijunction transistor 281. A capacitor 282 is arranged to receive a series of pulses from the output of transistor 270 at the frequency of the output from transformer 230 to progressively charge the capacitor 282. The upper base of the unijunction transistor 281 has connected thereto the line 238 through a resistor 285, while the lower base of the unijunction transistor 281 is connected to the line 260 through the magnetizing coil 227. A resistor 286 has one end thereof connected to the line 238 and the other end thereof connected to a line 287.

A coin receiving device, which is used to initiate the operation of the appliance 201, has a switch 290 connected to the line 260 through a capacitor 291 and an electro-magnetic device 292 which is operative to reject coins when deeneriged. The switch 290 has a pair of stationary contacts 295 and 296. An incrementally movable cam wheel 301 is used to actuate the movable arm 300a of switch 300 between contacts 298 and 299 while a sequencing cam 302 is used to actuate a switch 303 connected to the electromagnetic device 292. A capacitor 305 is connected between the resistor 286 and the magnetizing coil 226.

The DC voltage between the lines 238 and 260 is used to charge the capacitors 282, 291 and 305, to energize the electromagnetic device 292 and to apply operating voltages to the transistors 265, 270 and 281. An AC signal from the lower terminal of the secondary winding 232 is applied to one terminal of the capacitor 268 through one or more of the load resistors 240–244, while the diode 266 is connected between the center tap 233 of the transformer and the other terminal of the capacitor 268 to prevent the potential at the other terminal from going appreciably below the potential of line 260. The potential at the lefthand terminal of capacitor 268 will vary from zero (relative to line 260) to twice the amplitude of the AC signal applied to the righthand terminal of capacitor 268. The signal supplied to transistor 265 can be described as a sine wave with its negative peaks clamped to the potential of line 260. The transistor 265 is biased in the non-conductive state by a small positive DC voltage developed across the resistor 271, transistor 270 being in the conductive state. The transistor 265 will remain non-conductive until the incoming signal applied to the base thereof exceeds the small positive DC voltage applied to the emitter. Also during this time, the transistor 270 is rendered conductive by the forward bias applied thereto from the voltage divider resistor 272, 273 and 275. When the incoming voltage is greater than the DC voltage across the resistor 271, the transistor 265 will be rendered conductive regeneratively causing transistor 270 to become non-conductive. During the time interval when the transistor 270 is non-conductive the capacitor 282 will charge through resistors 278 and 280 and the rectifier 279. When the transistor 265 is switched to the non-conductive state by the incoming signal, transistor 270 becomes conductive again and the capacitor 282 will stop charging. Therefore, each time the transistor 265 is rendered conductive by the incoming singal, the capacitor 282 will receive an increment of charge. When the charge across the capacitor 282 has reached approximately 15 volts, the unijunction transistor 281 will be rendered conductive to discharge the capacitor 282 through the coil 227 of the switching device 225. This action will close the switch 218 and cause incremental rotation of the motor 215.

The incrementally movable cam wheel 301 will momentarily actuate the switch 300 thereby completely discharging the capacitor 282 in readiness for a subsequent timing cycle and allowing the capacitor 305 to become charged through the resistor 286 and the coil 226. When the switch 300 is deactuated the capacitor 305 is discharged through the coil 226 to produce a magnetic field of polarity to neutralize the bias magnetic field from magnet 228 to deactuate the switch 218 and stop the motor 215.

The time required to charge the capacitor 282 sufficiently to render the unijunction transistor 281 conductive is determined by the amplitude of the alternating signal applied to the capacitor 268, which in turn is varied by the resistors 240–244. If the amplitude of the controlling signal is small and only renders the transistor 265 conductive for very short periods of time, the transistor 270 will be rendered non-conductive for equally short periods of time so that the capacitor 282 will receive relatively small increments of charge and will require a longer period of time to become charged to the firing voltage of transistor 281. The transistor 265 is rendered conductive for longer periods of time when the control signal applied thereto is of larger amplitude. This action will cause the transistor 270 to be rendered non-conductive for longer periods of time, thereby applying larger increments of charge to the capacitor 282 and decreasing the time intervals between actuators of motor 215.

It can be seen therefore that by switching in resistors 240–244 sequentially, the timing of the successive appliance cycles is readily controlled. It should also be noted that the cams 222 and 302 in conjunction with the switches 221 and 303 form a similar circuit to that shown in FIGURE 1 wherein the cams 26 and 76 are used in conjunction with the switches 25 and 98.

SUMMARY OF OPERATION OF FIGURE 4

When the appliance 201 is ready for operation, the timing motor 215 and the sequencing cams connected thereto are in a preconditioned position. A given number of pulses from the coin counting switch 290 are required to set the appliance into a sequence of operation. After insertion of a predetermined number and denomination of coins the coin counting switch 290 is disabled and will reject any over amount of coins which may be inserted. When each coin is inserted, the incrementally movable timing motor 215 will advance one increment, and after the last coin has been inserted, the timing motor will be incrementally advanced to a position in which the motor will be controlled by a timing circuit that can be adjusted for the desired operation.

The operation of the incrementally movable timing motor 215, the sequencing cams connected thereto, and the reed switch assembly 225 are similar to that of the timing motor 65 in conjunction with the sequencing cams thereon, and the reed switch assembly 90 described in the summary of operation of FIGURE 1.

However, after the last coin is inserted, the timing motor will then be controlled by a transistor timing circuit thereby energizing a suitable motor which will incrementally move the sequencing cams through a complete cycle of operation.

A plurality of timing resistors 240–244 are selectively connected to the input of the timing circuit by a series of sequencing cams 251–256. When a low amplitude signal is applied to the input capacitor 268 a small charging pulse is applied to the capacitor 282 thereby requiring a long period of time to render the unijunction transistor 281 conductive so as to actuate the reed switch assembly 225 and energize the timing motor 215. When a high amplitude signal is applied to the capacitor 268 a larger charging pulse is applied to the capacitor 282 thereby requiring a shorter period of time to render the unijunction transistor 281 conductive so as to actuate the reed switch assembly 225 and energize the timing motor 215.

Figure 5:
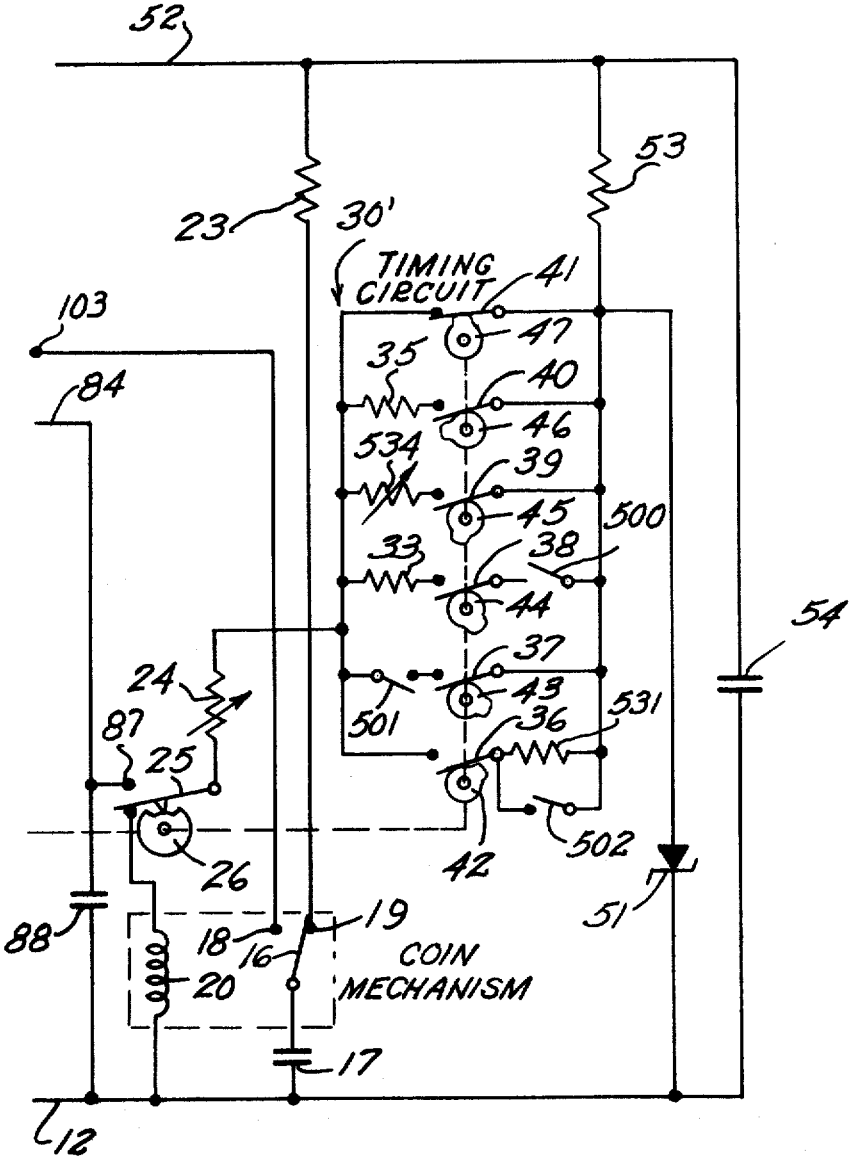
FIGURE 5 is a partial schematic diagram illustrating a modified form of the electric timing circuit shown in FIGURE 1.

As seen in FIGURE 5, the timing circuit 30 is modified to include a plurality of switches 500, 501 and 502 which are operated in response to condition sensing devices connected thereto. For purposes of simplicity, the condition sensing devices per se are not shown, and therefore the phrase "condition sensing device" and the phrase "condition sensing switch" will refer to the switches 500, 501 and 502.

For example, the normally open condition sensing switch 500 may be responsive to temperature which is sensed from the heated exhaust air of the appliance during the drying cycle. When used in this manner, the switch 500 will remain open during the drying cycle until the clothes being treated are dried to a predetermined level. Thereafter, the switch 500 will close completing the timing circuit through resistor 33 and charging capacitor 88 to continue the drying cycle for a preselected interval to insure complete drying of the clothes. The condition sensing switch 501 is connected in circuit with the timing circuit 30' and replaces the resistor 32. Therefore, closing the normally open switch 501 will rapidly charge the timing capacitor 88 which, in turn, will energize the drive motor 65 to advance the sequencing elements or cams connected thereto. The sequencing switch 501 may be responsive to the water level of the appliance being controlled. Furthermore, the sequencing switch 502 may be responsive to temperature of the clothes being treated. The sequencing switch 502 is connected in shunt relation with the resistor 531 thereby initially providing a time responsive sequence which is terminated when a preselected condition is sensed. For example, the condition sensing switch 502 may be used in the cool down cycle of the appliance where a preselected time interval for the cycle is established by the resistor 531 and wherein the cool down cycle is terminated prior to the expiration of the time interval should the fabric temperature reach a predetermined level prior to the completion of the cool down cycle.

It will be understood that various types of condition sensing devices may be associated with the timing circuit 30'. For example, devices responsive to temperature, pressure, light or vibration may be connected to the timing circuit 30' as desired to obtain the required results.

To further increase the flexibility of the timing circuit 30', one or more of the resistors associated therewith may be variable. For example, the resistor 34 is replaced with a variable resistor 534 which may be used to vary the time duration of the wash cycle.

Figure 6:
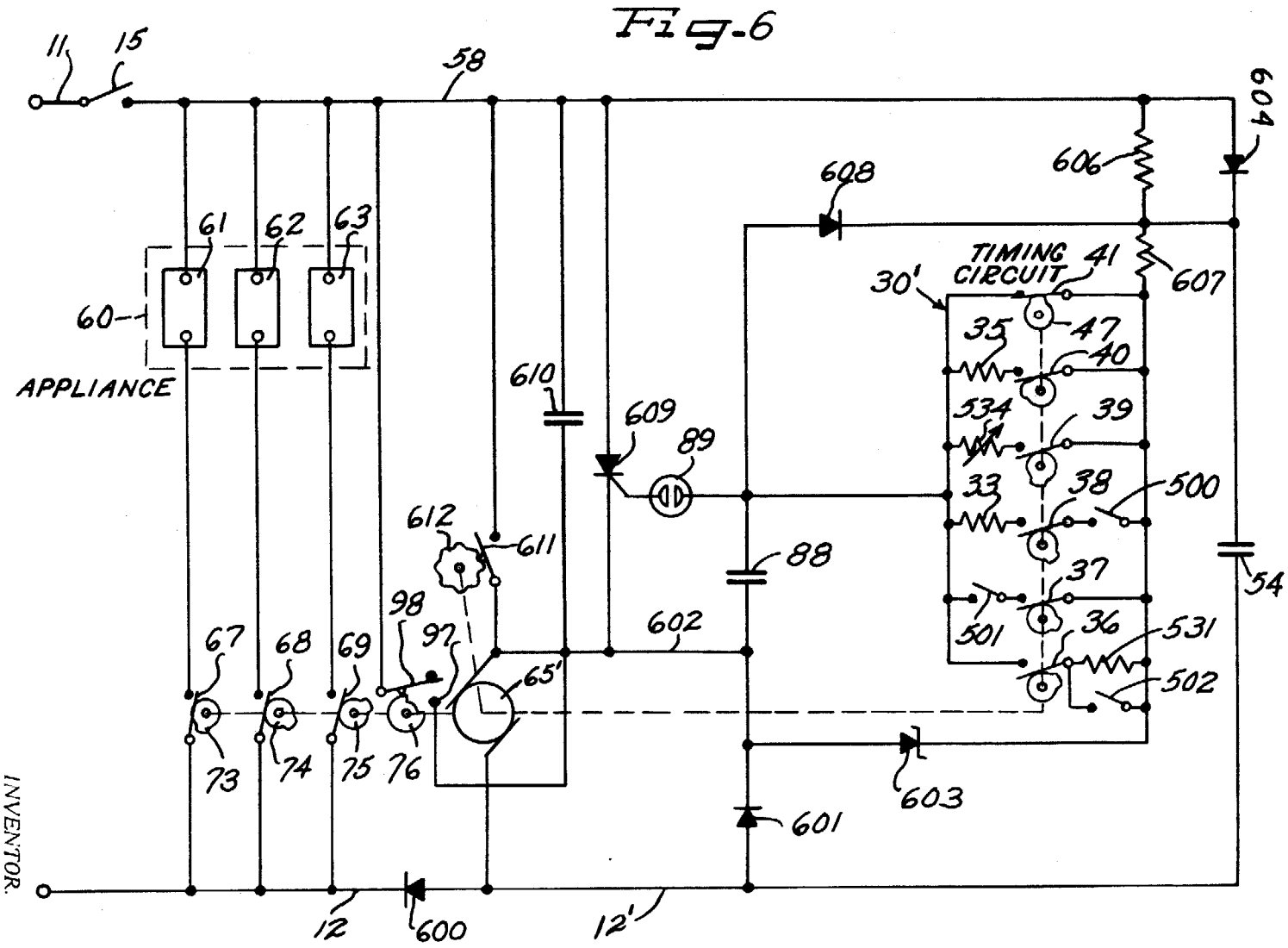
FIGURE 6 is a schematic diagram illustrating a modified form of the motor energizing circuit of FIGURE 1.

FIGURE 6 shows a modified circuit arrangement of the sequencing control circuit of FIGURE 1 which includes the modified timing circuit 30' of FIGURE 5. The drive mechanism start circuit is substantially the same as that shown in FIGURE 1 in that the neon lamp 89 is fired in response to a predetermined voltage charge across the charging capacitor 88. The starting pulse created by the ionization of the neon lamp 89 is used to trigger an electronic switching device, as will be described in full detail hereinbelow.

The diode 57 of FIGURE 1 is removed and replaced with a diode 600 connected in series with the line 12. A diode 601 has its anode connected to the line 12' and its cathode connected to a line 602 which, in turn, is connected to one end of the drive mechanism 65'. A Zener diode 603 is connected in shunt relation with the timing circuit 30' and the charging capacitor 88 to maintain the voltage drop thereacross substantially constant. Therefore, variations in line potential will not affect the timing circuit 30′ and the timing function thereof.

A charging diode 604 has its anode connected to the line 58 and its cathode connected to one end of capacitor 54 to provide a low resistance charge path for the capacitor 54. A resistor 606 is connected in shunt relation to the diode 604 to provide a high resistance discharge path for the capacitor 54, as will be explained hereinbelow.

A current limiting resistor 607 has one end thereof connected to the resistor 606 and the cathode of the diode 604 and the other end thereof connected to the timing circuit 30′.

To insure that the charging capacitor 88 is fully discharged at the end of each timing cycle so that the next preceding timing cycle will start at a zero reference, a discharge diode 608 is connected between the capacitor 88 and the circuit point between the resistors 606 and 607.

The magnetically operated switch 93 of the magnetic actuating device 90, of FIGURE 1, is replaced with a silicon controlled rectifier 609 which now forms the energizing circuit for the drive mechanism 65′. The provision of the silicon controlled rectifier 609 greatly simplifies the circuit arrangement of the sequencing control circuit and also increases the reliability thereof. A capacitor 610 is connected in shunt relation with the silicon controlled rectifier 609 and together with the diode 601 provide a transient suppression circuit to ensure proper performance of the silicon controlled rectifier 609.

To terminate the operation of the drive mechanism 65′ a terminating circuit including a terminating switch 611 is also connected in shunt relation with the silicon controlled rectifier 609, and the switch 611 is operated by a cam 612 which, in turn, is connected to the drive mechanism 65′ for rotation thereby.

The gate electrode of silicon controlled rectifier 609 is connected to the charging capacitor 88 through the neon lamp 89. Therefore, ionization of the neon lamp 89 will deliver a triggering pulse to the gate electrode of silicon controlled rectifier 609 to render the silicon controlled rectifier conductive. This action will energize the drive mechanism 65′ and cause the cam 612 to rotate sufficient to close the terminating switch 611. Upon closing of the switch 611, all of the energizing current for the drive mechanism 65′ will pass through the switch 611 thereby decreasing the current flow through the silicon controlled rectifier 609 below its characteristic holding current to render the silicon controlled rectifier non-conductive. The drive mechanism 65′ will continue to rotate until the terminating switch 611 is opened by the cam 612 to remove the energizing current from the mechanism 65′.

For purposes of simplicity, the coin counting mechanism of FIGURE 1 is not shown in the modified circuit arrangement of FIGURE 6. However, it will be understood that such a coin counting mechanism can be incorporated in the arrangement of FIGURE 6 if desired.

SUMMARY OF OPERATION OF FIGURE 6

When AC current is applied between lines 58 and 12, only the positive half-cycles are impressed across the lines 58 and 12′ due to the action of the blocking diode 600. The positive pulses are applied to capacitor 54 through the charging diode 604. The charging diode 604 provides a low resistance charge path for the capacitor 54.

The timing circuit 30′ is connected across the DC potential of the capacitor 54 through the current limiting resistor 607. The resistance of resistor 607 is relatively high as compared to the low resistance path through the blocking diode 604 to further provide a high resistance discharge path for the capacitor 54. However, it will be understood that the resistance of the resistor 607 is relatively low as compared to the sequence timing resistor 35, 534, 33 and 351 of the timing circuit 30′. Therefore, when either switch 41 or switches 37 and 501 are closed, the timing capacitor 88 will charge rapidly through resistor 607, timing circuit 30′, and the motor 65. After capacitor 88 has charged, it will ionize neon lamp 89 which will energize the silicon controlled rectifier 609 through its gate electrode.

The starting circuit, which comprises neon lamp 89, will render the silicon controlled rectifier 609 conductive when the charge across the timing capacitor 88 has reached the ionization potential of the neon lamp. Therefore, during the positive half-cycles, as sensed by line 58, energizing current will be delivered to the drive mechanism 65′. However, during the negative half-cycles on line 58 energizing current is not delivered to the drive mechanism 65′. The design of the drive mechanism 65′ is such that is will operate when energized by the intermittent half-wave current supplied only during the positive half-cycle on line 58. To ensure that the silicon controlled rectifier will remain conductive during the negative half-cycles of line 58, and to ensure that the silicon controlled rectifier 609 will be rendered conductive during such time, when a trigger pulse is applied to the gate electrode thereof, a holding current path is provided. This holding current path is from the positive side of the capacitor 54 through resistor 606 and then through the silicon controlled rectifier to the negative side of the capacitor 54.

During the time interval when silicon controlled rectifier 609 is conductive, a discharge path for timing capacitor 88 is provided through the discharge diode 608, resistor 606 and silicon controlled rectifier 609 thereby completely discharging the timing capacitor 88. Therefore, when the operation of the drive mechanism 65′ is terminated, the charging capacitor 88 is ready ot receive charging current through the charging circuit 30′ and to time the next sequence of operation. This circuit arrangement compensates for the relatively high deionization potential of neon lamp 89. That is, the neon lamp 89 will become non-conductive before the timing capacitor 88 is completely discharged, and therefore, it is necessary to remove the remaining charge on capacitor 88.

As mentioned hereinabove, when the silicon controlled rectifier 609 is rendered conductive, the drive mechanism 65′ is energized. This action will advance the sequencing elements for cams connected to the drive mechanism to shift the operation from one of the controlled circuit elements 61–63 to another one of the controlled circuit elements 61–63. Also, during the energization of the drive mechanism 65′ the cam 612, which is analogous to the cam 77 of FIGURE 1, is rotated to close the switch 611. Therefore, all of the energizing current delivered to the drive mechanism 65′ passes through the switch 611 and the current passing through the silicon controlled rectifier 609 will drop below the required holding current thereof thereby rendering the silicon controlled rectifier non-conductive. The drive mechanism 65′ will continue to rotate until the switch 611 is opened by the action of the cam 612 which will terminate the operation of the drive mechanism 65′.

The capacitor 610, which is connected in parallel with the silicon controlled rectifier 609, and the diode 901 are combined to form a transient suppression circuit thereby improving the reliability of the control system.

The circuit arrangement as shown in FIGURE 6 provides a new and improved timing and sequencing control circuit which utilizes a simple and inexpensive drive mechanism. It will be understood that the arcuate travel between each step or advance of the drive mechanism may be kept small by providing many lobes on the cam 612. This feature will enable the sequencing and control circuit of the present invention to provide many machine functions in a single 360° rotation of the drive mechanism. Although the switch 611 is shown as cam operated, it will be understood that a switch contact may engage a movable wiper arm or commutator connected directly to the drive mechanism, if desired.

Therefore, the present invention provides a new and improved timing and sequencing control system which simplifies the construction and operation of an appliance. Although the present invention has been described in connection with the appliances such as washers and driers, it is not to be construed as limited solely thereto, Variations and modifications may be effected without departing from the spirit and scope of the novel concepts of this invention.

The embodiments of the invention in which an exclusive property or privilege is claimed are defined as follows:

1. In an appliance control circuit having an incrementally movable timer device for controlling the duration of a cycle of operation of an appliance and having switch means for actuation a predetermined number of times as a precondition to operation of the appliance, precondition means requiring actuation as a preconditon to setting of said appliance in operation, timer control means controlling actuation of said timer device and responsive to actuation of said switch means to step said timer device through an increment of movement, timer actuation responsive means coupled to said precondition means and to said timer device and responsive to a predetermined number of increments of movement of said timer device to actuate said precondition means, and means under the control of said precondition means for thereafter enabling the automatic cycling of said timer device to control the duration of a cycle of operation of the appliance.

2. In an appliance control circuit as defined in claim 1, means driven by said timer device and controlling the end of cycle position of said timer device and being adjustable to vary the end of cycle position of said timer device to correspondingly vary the number of actuations of said switch means required to actuate said precondition means.

3. In an appliance control circuit as defined in claim 1, said timer control means comprising:

a reed switch assembly having timer control contact means controlling energization of said timer device, means responsive to closure of said switch to actuate said reed switch assembly and close said timer control contact means thereof, said reed switch assembly having a bias means for producing a magnetic field of strength to hold said timer control contact means in closed condition, said reed switch assembly having a winding for energization to produce a release magnetic field overcoming the holding effect of said bias means to release said contact means, and said timer control means further comprising:

means coupled with said timer device and responsive to each incremental movement thereof to supply a release current pulse to said winding of said reed switch assembly of polarity to release said timer control contact means thereof.

4. In an appliance control circuit as defined in claim 3 and further characterized by said switch closure responsive means supplying actuating current pulses to said winding of said reed switch assembly of polarity to close said timer control contact means thereof.

5. In an appliance control circuit, a timer device for actuation step-by-step to drive a plurality of sequencing elements of an appliance, relay means controlling energization of said timer device and having first and second energizing circuits, a first switch controlling said first energizing circuit of said relay means, a second switch controlling said second energizing circuit of said relay means, means for actuating said first switch a predetermined number of times in response to fulfillment of a predetermined condition to actuate said relay means and thus actuate said timer device a corresponding number of times, and means controlling said second switch and responsive to actuation of said timer device said predetermined number of times to actuate said second switch.

6. In an appliance control circuit, a timer device for actuation step-by-step to drive a plurality of sequencing elements of an appliance, relay means controlling energization of said timer device and having first and second energizing circuits, a first switch controlling said first energizing circuit of said relay means, a second switch, receiving means for actuating said first switch in response to fulfillment of a predetermined condition to actuate said relay means and thus said timer device, means controlling said second switch and responsive to actuation of said timer device to actuate said second switch, a timing circuit controlled by said second switch and controlling the supply of energy to said second energizing circuit of said relay means to actuate said relay means by means of said second energizing circuit a predetermined time after actuation of said second switch, and means responsive to a predetermined number of actuations of said timer device to change the time delay provided by said timing circuit,

7. In an appliance control circuit, a series of sequencing elements for movement to control the operation of an appliance, a rotatable timer drive device for driving said sequencing elements and having an energizing circuit, timer operating means controlling said energizing circuit of said timer drive device and operable to incrementally actuate said timer drive device, and a timing circuit providing a variable timing interval between the incremental actuations of said rotatable timer drive device for controlling operation of said sequencing elements.

8. In an appliance control circuit, a series of sequencing elements for movement to sequence the operation of an appliance, a rotatable timer drive device for driving said sequencing elements and having an energizing circuit, a relay controlling said energizing circuit of said timer drive device and having a relay actuating circuit operable to incrementally actuate said rotatable timer drive device, a timing circuit providing a variable timing interval between the incremental actuations of said rotatable timer drive device for controlling the operation of said sequencing elements, said timing circuit having a plurality of time interval control elements, and means responsive to rotational movement of said rotatable timer drive device to connect different ones of said time interval control elements in said timing circuit at respective times in the operation of said rotatable timer drive device.

9. In an appliance control circuit, a series of sequencing elements for movement to control the operation of an appliance, a rotatable timer drive device for driving said sequencing elements and having an energizing circuit, timer operating means controlling said energizing circuit of said rotatable timer drive device and operable to incrementally actuate said rotatable timer drive device, a timing circuit providing a variable timing interval between the incremental actuations of said rotatable timer drive device for controlling the operation of said sequencing elements, said timing circuit having a plurality of time interval control elements, and means responsive to movement of said rotatable timer drive device to connect different ones of said time interval control elements in said timing circuit at respective times in the operation of said rotatable timer drive device.

10. In an appliance control circuit, a series of sequencing elements for movement to control successive steps in the operation of an appliance, a motor for driving said sequencing elements and having an energizing circuit, timer operating means controlling said energizing circuit of said motor and operable to incrementally actuate said motor, a timing circuit providing a variable timing interval and controlling said timer operating means to vary the speed of operation of said sequencing elements, said timing circuit being controlled by a plurality of variable width pulses and providing timing intervals in accordance with the width of said pulses, and means responsive to said motor to vary the width of said variable width pulses in successive portions of the operating cycle of said motor.

11. In an appliance control circuit, a series of sequencing elements for movement to vary the operation of appliance, a motor for driving said sequencing elements and having an energizing circuit, a relay controlling said energizing circuit of said motor and having a relay actuating circuit, a timing circuit providing a variable timing interval and controlling said relay actuating circuit to vary the speed of operation of said sequencing elements, said timing circuit being controlled by a series of variable width pulses, and means for adjusting the width of said variable width pulses to correspondingly adjust the speed of operation of said sequencing elements.

12. In an appliance control circuit having an incrementally movable timer device for controlling the duration of a cycle of operation of an appliance and having a switch for actuation a plurality of times as a precondition to operation of the appliance, precondition means requiring actuation as a precondition to setting of said appliance in operation, control means controlling actuation of said timer device and responsive to each actuation of said switch to step said timer device through an increment of movement, timer actuation responsive means coupled to said precondition means and to said timer device and responsive to a predetermined number of increments of movement of said timer device to actuate said precondition means, means under the control of said precondition means for thereafter enabling the automatic cycling of said timer device to control the duration of a cycle of operation of the appliance, and means responsive to actuation of said precondition means to disable said switch.

13. In an appliance, a step-by-step timer device having an actuating circuit, a coin-counting circuit having a coin switch for actuation a predetermined number of times by coins, a relay controlling said actuating circuit of said timer device and having a start circuit energized each time said coin switch is actuated, means for holding said relay actuated after actuation thereof, means for releasing said relay, means responsive to an increment of movement of said timer device to momentarily energize said relay release means to release seaid relay, means for enabling operation of said appliance in response to a predetermined number of incremental movements of said timer device, and means in said appliance controlled by said timer device during normal operation of said appliance.

14. In an appliance, a step-by-step timer device having an actuating circuit, a coin-counting circuit having a coin switch for actuation a predetermined number of times by coins, reed type relay means having reed operated contacts controlling said actuating circuit of said timer device and having a start winding for energization each time said coin switch is actuated and having a permanent magnet for holding said reed contacts closed upon engagement thereof by energization of said start winding, means for releasing said relay means, means responsive to an incremental movement of said timer device to momentarily energize said releasing means to release said relay means, means for controlling the normal operation of said appliance in response to a predetermined number of incremental movements of said timer device, and means in said appliance controlled by said timer device during normal operation of said appliance.

15. In an appliance, a step-by-step timer device comprising:

a motor having an alternating current actuating circuit, a series of sequencing elements driven by said motor, relay means controlling said alternating current actuating circuit of said motor and having a start circuit for periodic energization during operation of the appliance in response to the position of said sequencing elements to incrementally actuate said motor, and means responsive to movement of said motor at the end of a cycle of operation to automatically interrupt said start circuit.

16. An appliance, control system comprising:

a step-by-step timer device having an actuating circuit, relay means controlling said actuating circuit of said timer device and having actuating means controlling actuation of said relay means, means for holding said relay means actuated after actuation thereof for a limited time interval, time delay means providing a time delay and operable after said time delay to energize said actuating means after each movement of said timer device, and means responsive to said timing device for automatically changing the time delay provided by said time delay means in respective parts of the appliance cycle.

17. In an appliance, a step-by-step timer device having an actuating circuit, initiating means actuatable to initiate operation of said appliance, relay means controlling said actuating circuit of said timer device and having a start circuit engaged each time said initiating means is actuated, means for holding said relay means actuated after actuation thereof, means for releasing said relay means, means responsive to an increment of movement of said timer device to momentarily energize said releasing means to release said relay means, means for enabling normal operation of said appliance and actuated in response to a predetermined number of increments of movement of said timer device, means in said appliance controlled by said timer device during normal operation of said appliance, and a variable timing circuit controlling the speed of operation of said timer device and selectively adjustable to vary the duration of the operating cycle of the appliance.

18. In an appliance, a step-by-step timer device having an actuating circuit, relay means controlling said actuating circuit of said timer device and having a start circuit for actuation to operate said timer device, means for holding said relay means actuated after actuation thereof, means for releasing said relay means, means responsive to an increment of movement of said timer device to momentarily energize said releasing means to release said relay means, a variable timing circuit controlling actuation of said start circuit and adjustable for selectively ch nging the speed of operation of said timer device, and sequencing elements driven by said timer device and having rates of advance which are collectively varied by adjustment of said variable timing circuit.

19. In an appliance, a step-by-step timer device having an actuating circuit, a coin counting circuit having a coin switch for actuation a predetermined number of times, relay means controlling said actuating circuit of said timer device and having a start circuit which is energized each time said coin switch is actuated, means for holding said relay means actuated after actuation thereof, means for releasing said relay means, means responsive to an increment of movement of said timer device to momentarily energize said releasing means to release said relay means, a coin rejection means, and means responsive to a predetermined number of incremental movements of said timer device to actuate said coin rejection means.

20. In an appliance control circuit, a timer device for actuation step-by-step to drive a plurality of sequencing elements of an appliance, relay means controlling energization of said timer device and having first and second energizing circuits, a first switch controlling said first energizing circuit of said relay means, a second switch controlling said second energizing circuit of said relay means, receiving means for actuating said first switch a predetermined number of times in response to fulfillment of a predetermined condition to actuate said relay means and thus actuate said timer device a corresponding number of times, means controlling said second switch and responsive to actuation of said timer device said predetermined number of times to actuate said second switch, and means responsive to the movement of said timer device to a position near the end of its cycle to energize said timer device independently of said relay means until said timer device moves to a predetermined initial position from which said predetermined number of actuations of said timer device is required before actuation of said second switch to reset said timer device at the end of the appliance cycle.

21. In an appliance control circuit having an incrementally movable timer device for controlling a cycle of operation of an appliance and having a switch for actuation a plurality of times as a precondition to operation of the appliance, precondition means requiring actuation as precondition to setting of said appliance in operation, timer control means controlling actuation of said timer device and responsive to each actuation of said switch to step said timer device through an increment of movement, timer actuation responsive means coupled to said precondition means and to said timer device and responsive to a predetermined number of increments of movements of said timer device to actuate said precondition means, means under the control of said precondition means for thereafter enabling the automatic cycling of said timer device to control a cycle of operation of the appliance, and means responsive to the timer device reaching a point near the end of its cycle to continuously energize said timer device for continuous movement thereof to a reset position.

22. In an appliance, a timer motor means having an output means and operable for counting coins and for driving timing elements for said appliance, means for stepping said output means of said timer motor from a reset position to a cycle start position in response to receipt of a predetermined number of coins and for thereafter stepping said timer motor until an end of cycle position of said motor output means is reached, and means for continuously energizing said motor and responsive to movement of said motor output means to said end of cycle position to initiate continuous energization of said motor in response to the motor outupt means reaching said reset position to interrupt energization of said motor.

23. In a machine control circuit, a plurality of sequencing elements for movement to control the operation of a machine, drive means periodically advanced in increments for driving said sequencing elements, an energizing circuit for supplying electrical energy to said drive means for actuation thereof and including energizing circuit control means for controlling the energization of said energizing circuit, a starting circuit for controlling the energizing circuit control means, a timing circuit periodically completing said starting circuit for closing said energizing circuit through said energizing circuit control means and energizing said drive means, and a terminating circuit including means operated by the actuation of said drive means for opening said energizing circuit through said energizing circuit control means to deactuate said drive means.

24. The machine control circuit claim 23 wherein said energizing circuit control means includes a selectively conductive silicon controlled rectifier, and wherein said starting circuit includes a gate circuit connected to said silicon controlled rectifier for controlling the conductive state thereof.

25. The machine control circuit of claim 24 wherein said terminating circuit in a shunt circuit in parallel with said silicon controlled rectifier, and wherein said means operated by the actuation of said drive means is a cam operated switch for closing said shunt circuit in response to rotation of said drive means to continue the supply of electrical energy to said drive means while deenergizing said energizing circuit, said cam operated switch opening said shunt circuit upon further rotation of said drive means to deactuate said drive means.

26. The machine control circuit of claim 23 wherein said energizing circuit control means includes a magnetically operated switch means, and wherein said starting circuit includes a magnetic coil operable to close said magnetically operated switch means for completing said energizing circuit.

27. The machine control circuit of claim 26 wherein said terminating circuit includes a second magnetic coil operable to open said magnetically operated switch means for deactuating said drive means, and wherein said means operated by the actuation of said drive means is a cam operated switch for energizing said terminating circuit in response to rotation of said drive means.

28. The machine control circuit of claim 23 wherein said timing circuit includes variable time delay means for establishing the duration of the intervals between periodic completions of said starting circuit.

29. The machine control circuit of claim 28 wherein said variable time delay means includes
capacitance means, and
variable resistance means for varying the charging rate of said capacitance means.

30. The machine control circuit of claim 23 wherein said timing circuit includes
capacitance means, and
resistance means for controlling the charging rate of said capacitance means.

31. The machine control circuit of claim 30 wherein said timing circuit further includes
condition responsive means connected in series with said resistance means and responsive to an operational condition of the machine, said condition responsive means rendering said timing circuit ineffective to control said starting circuit until said operational condition of the machine has been satisfied.

32. The machine control circuit of claim 30 wherein said timing circuit further includes
condition responsive means connected in parallel with said resistance means and responsive to an operational condition of the machine, said condition responsive means rendering said resistance means ineffective to control the charging rate of said capacitance means when the operational condition of the machine has been satisfied.

33. A programming device for sequentially actuating a plurality of controlled circuit elements throughout an operational cycle and providing a series of intervals of varying duration between the sequential actuations of said controlled circuit elements comprising:
a control circuit electrically connected to said controlled circuit elements for the energization thereof,
switch means in said control circuit controlling the energization of said controlled circuit elements,
programming means regulating the actuation of said switch means,
drive means driving said programming means through a series of operational positions for sequential actuation of said switch means,
an energizing circuit for supplying electrical energy to said drive means and including energizing circuit control means for controlling the energization of said energizing circuit,
a starting circuit for controlling the energizing circuit control means,
a timing circuit automatically sending periodic pulses to said starting circuit for closing said energizing circuit through said energizing circuit control means and energizing said drive means,
said timing circuit including variable time delay means for establishing the duration of the intervals between said periodic pulses, and
a terminating circuit including means operated by the energization of said drive means for opening said energizing circuit through said energizing circuit control means to deenergize said drive means.

34. A control system for sequentially operating a plurality of devices of a machine, comprising:
a power source,
a drive motor,
a first group of switches for controlling the energizing of said devices,
a second group of switches,
first and second groups of sequencing elements connected to said motor for rotation therewith,
each of said first group of sequencing elements positioned adjacent a corresponding one of said first group of switches for actuation thereof, and each of said second group of sequencing elements positioned adjacent a corresponding one of said second group of switches for actuation thereof, a motor energizing circuit for selectively connecting said drive motor to said power source,
a control circuit including said second group of switches and said second group of sequencing elements for generating sequencing signals,
a starter circuit connected between said motor energizing circuit and said control circuit for actuating said motor energizing circuit in response to said sequencing signals to energize said drive motor, and
a terminating circuit connected between said power source and said drive motor and operable by said drive motor for deenergizing thereof in response to rotation of said drive motor through a preselected quantum of rotation.

35. The control system of claim 34 wherein
said motor energizing circuit includes an electronic switching device having anode and cathode electrodes and a controlled electrode, and
said controlled electrode being connected to said starting circuit to render said electronic switching device conductive in response to said sequencing signal.

36. The control system of claim 35 wherein
said terminating circuit includes a switch connected in shunt relation with said electronic switching device, and
a cam connected to said drive motor for rotation therewith,
said cam positioned in proximity with said switch for actuation thereof,
whereby, energization of said drive motor will advance said cam to close said switch to provide a current path for substantially all of the motor energizing current thereby rendering said electronic switching device non-conductive during the remainder of the motor energizing cycle, and to deenergize said drive motor when said switch is opened by said cam.

37. The control system of claim 34 wherein said control circuit further includes:
a timing capacitor having one end thereof connected to a circuit point with said starting circuit,
a source of direct current potential connected to said second group of switches, and
means connected between said circuit point and said second group of switches for controlling the rate of charge of said timing capacitor from said direct current potential in response to the actuation of at least one of said second group of switches by said second group of sequencing elements.

38. The control system of claim 37 further including a discharge diode having its anode connected to said circuit point, and
circuit means connecting the cathode of said discharge diode to said starting circuit,
whereby actuation of said starting circuit will cause a portion of the current charge on said timing capacitor to flow through said discharge diode and said starting circuit to ensure complete discharge of said timing capacitor during each cycle of operation.

39. The control system of claim 34 wherein
said control circuit further includes at least one condition sensing switch connected in circuit with said second group of switches to cause a sequencing signal to be generated irrespective of time thereby energizing said drive motor in response to a preselected sensed condition.

40. The control system of claim 34 wherein
said control circuit further includes resistance means connected between said starting circuit and each of said second group of switches, and a plurality of condition sensing switches connected in circuit with certain ones of said second group of switches to actuate said starting circuit in response to a preselected sensed condition irrespective of time.

*41. In a time sequence switch, a step-advance means comprising, an electronic switching means, a variable periodicity timing circuit, said timing circuit activating said electronic switching means at predetermined time intervals, said electronic switching means energizing a motor, said motor advancing said time sequence switch, cam-switching means de-energizing said motor after said time sequence switch has advanced a predetermined amount, and said cam-switching means resetting said timing circuit.*

*42. In a time sequence switch, a step-advance means comprising, an electronic switching means, a variable periodicity timing circuit, means for varying the periodicity of said timing circuit during portions of a programmed timing cycle, said timing circuit activating said electronic switching means at predetermined time intervals, said electronic switching means energizing a motor, said motor advancing said time sequence switch, cam-switching means de-energizing said motor after said time sequence switch has advanced a predetermined amount, and said cam-switching means resetting said timing circuit.*

*43. In a time sequence switch, a step-advance means comprising, an electronic switching means, a variable periodicity timing circuit, means for automatically varying the periodicity of said timing circuit during portions of a programmed timing cycle, said timing circuit activating said electronic switching means at predetermined time intervals, said electronic switching means energizing a motor, said motor advancing said time sequence switch, cam-switching means de-energizing said motor after said time sequence switch has advanced a predetermined amount, and said cam-switching means resetting said timing circuit.*

References Cited

The following references, cited by the Examiner, are of record in the patented file of this patent or the original patent.

UNITED STATES PATENTS

| | | | |
|---|---|---|---|
| 3,161,481 | 12/1964 | Edwards | 34—53 X |
| 3,191,738 | 6/1965 | New | 194—9 |
| 3,237,466 | 3/1966 | Purtilo | 194—9 |
| 3,350,606 | 10/1967 | Hirsch | 317—22 |
| 3,381,177 | 4/1968 | Allen | 317—22 |

STANLEY H. TOLLBERG, Primary Examiner

U.S. Cl. X.R.

317—22

UNITED STATES PATENT OFFICE

CERTIFICATE OF CORRECTION

Patent No. Re. 26,957 Dated September 29, 1970

Inventor(s) J. L. McConnell

It is certified that error appears in the above-identified patent and that said Letters Patent are hereby corrected as shown below:

Claim 13, column 15, line 70, "said" is misspelled as "seaid".

Claim 25, column 18, line 51, "in" should be --is--.

SIGNED AND
SEALED
DEC 29 1970

(SEAL)
Attest:

Edward M. Fletcher, Jr.
Attesting Officer

WILLIAM E. SCHUYLER, JR.
Commissioner of Patents

Disclaimer

Reissue No. 26,957.—*James L. McConnell*, St. Joseph, Mich. ELECTRONIC TIMER ESCAPEMENT AND COIN COUNTER. Patent dated Sept. 27, 1970. Disclaimer filed Sept. 4, 1973, by the assignee, *Whirlpool Corporation.*

Hereby enters this disclaimer to claims 18 and 24 of said patent.

[*Official Gazette October 23, 1973.*]

Disclaimer

Reissue No. 26,957.—*James L. McConnell*, St. Joseph, Mich. ELECTRONIC TIMER ESCAPEMENT AND COIN COUNTER. Patent dated Sept. 27, 1970. Disclaimer filed Feb. 21, 1973, by the assignee, *Whirlpool Corporation.*

Hereby enters this disclaimer to claims 7, 8, 9, 15, 16, 23, 26, 28, 34, 35, 36, 41, 42 and 43, of said patent.

[*Official Gazette November 13, 1973.*]